(12) United States Patent
Lee

(10) Patent No.: US 10,153,646 B2
(45) Date of Patent: Dec. 11, 2018

(54) BATTERY OVERCHARGE PREVENTING DEVICE

(71) Applicant: SK Innovation Co., Ltd., Seoul (KR)

(72) Inventor: Yun Nyoung Lee, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

(21) Appl. No.: 14/906,922

(22) PCT Filed: Jul. 23, 2014

(86) PCT No.: PCT/KR2014/006694
§ 371 (c)(1),
(2) Date: Jan. 22, 2016

(87) PCT Pub. No.: WO2015/012587
PCT Pub. Date: Jan. 29, 2015

(65) Prior Publication Data
US 2016/0156205 A1    Jun. 2, 2016

(30) Foreign Application Priority Data

Jul. 25, 2013   (KR) .................. 10-2013-0087922

(51) Int. Cl.
*H02J 7/00*  (2006.01)
*H02H 7/18*  (2006.01)
*H01M 10/44* (2006.01)
*H01M 10/48* (2006.01)
*H01M 10/42* (2006.01)

(52) U.S. Cl.
CPC ......... *H02J 7/0026* (2013.01); *H01M 10/441* (2013.01); *H01M 10/482* (2013.01); *H02H 7/18* (2013.01); *H02J 7/0029* (2013.01); *H02J 7/0031* (2013.01); *H01M 2010/4271* (2013.01); *H02J 2007/0037* (2013.01)

(58) Field of Classification Search
CPC ...... H02J 7/0026; H02J 7/0031; H02J 7/0029; H02J 2007/0037; H01M 10/482; H01M 10/441; H01M 2010/4271; H02H 7/18
USPC .................................... 320/132, 134
See application file for complete search history.

(56) References Cited

U.S. PATENT DOCUMENTS

| | | | |
|---|---|---|---|
| 5,714,869 A * | 2/1998 | Tamechika | H02J 7/0031 320/101 |
| 6,678,183 B2 | 1/2004 | Creger et al. | |
| 6,943,529 B2 | 9/2005 | Cheiky et al. | |
| 8,954,777 B2 * | 2/2015 | Tatsumoto | G06F 1/263 320/127 |
| 2006/0139008 A1 | 6/2006 | Park | |
| 2011/0050000 A1 | 3/2011 | Park | |

(Continued)

FOREIGN PATENT DOCUMENTS

| | | |
|---|---|---|
| CN | 201490686 U | 5/2010 |
| EP | 1662632 A1 | 5/2006 |
| JP | 5268732 A | 10/1993 |

(Continued)

*Primary Examiner* — Edward Tso
*Assistant Examiner* — Ahmed Omar
(74) *Attorney, Agent, or Firm* — The Webb Law Firm

(57) ABSTRACT

Provided is a battery overcharge preventing device. The battery overcharge preventing device may sense an overvoltage using a voltage of a battery cell as input power of a passive element and cut off power supplied to a battery at the time of overcharge of the battery.

10 Claims, 8 Drawing Sheets

(56) References Cited

U.S. PATENT DOCUMENTS

2011/0298463 A1  12/2011  Saito et al.
2012/0161712 A1   6/2012  Saito

FOREIGN PATENT DOCUMENTS

| JP | 200464977 A | 2/2004 |
| JP | 3581428 B2 | 10/2004 |
| JP | 2008206250 A | 9/2008 |
| JP | 2010203790 A | 9/2010 |
| JP | 2012139057 A | 7/2012 |
| KR | 20020009287 A | 2/2002 |
| KR | 20030039579 A | 5/2003 |
| KR | 1020040068117 A | 7/2004 |

* cited by examiner

BATTERY OVERCHARGE PREVENTING DEVICE

CROSS-REFERENCE TO RELATED APPLICATIONS

This application is the United States national phase of International Application No. PCT/KR2014/006694 filed Jul. 23, 2014, and claims priority to Korean Patent Application No. 10-2013-0087922 filed Jul. 25, 2013, the disclosures of which are hereby incorporated in their entirety by reference.

TECHNICAL FIELD

The present invention relates to a battery overcharge preventing device, and more particularly, to a battery overcharge preventing device capable of sensing an over-voltage using a voltage of a battery cell as input power of a passive element and cutting off power supplied to a battery at the time of overcharge of the battery.

BACKGROUND ART

An existing runaway arrest device (RAD) sensing and cutting off overcharge of a battery of an electrically driven vehicle senses whether or not the battery is overcharged using a swelling phenomenon that a battery cell is swelled when the battery is overcharged. The RAD is configured to include a switch disposed on a side surface of the battery cell, wherein the switch is physically pushed by a swelling displacement amount of the side surface of the battery cell to sense whether or not the battery is overcharged. The RAD may be configured so that the switch is connected to a relay control line controlling power of the battery in series to cut off the power supplied to the battery when the battery is overcharged or notify a battery management system (BMS) of an abnormal phenomenon through a high voltage interlock loop (HVIL) sensing a binding state of the battery, thereby cutting off the power supplied to the battery.

However, since the RAD depends on the swelling phenomenon occurring when the battery is overcharged, when considering that the swelling phenomenon of the battery cell is a phenomenon irregularly occurring according to characteristics of the battery itself, it may be difficult to accurately sense whether or not the battery is overcharged. In addition, there are problems that several situations should be considered, for example, the switch positioned on the side surface of the battery cell and the battery cell should be configured to have a constant interval therebetween, which is difficult, the possibility of a malfunction due to external impact, or the like, is present, and a space in which the switch is mounted is required on the side surface of the battery cell in order to sense the swelling of the side surface of the battery cell.

In addition, an existing current interrupt device (CID) sensing and cutting off the overcharge of the battery of the electrically driven vehicle has a configuration in which a tab part of the battery cell is cut so that the battery cell deviates from an original position using the swelling phenomenon of the battery cell when the battery is overcharged.

However, since the CID has a weak point mechanically formed intentionally in order to operate sensitively to the swelling phenomenon of the battery cell occurring when the battery is overcharged, it has a disadvantage that mechanical reliability is decreased and a disadvantage that a space in which a device is mounted is required on the side surface of the battery cell in order to sense the swelling phenomenon of the battery cell, as in the RAD.

U.S. Patent Application Publication No. 2011-0298463 has disclosed a battery state monitoring circuit and a battery device.

DISCLOSURE

Technical Problem

An object of the present invention is to provide a battery overcharge preventing device capable of sensing overcharge by an electrical change and cutting off power supplied to a battery at the time of the overcharge of the battery using a passive element.

Technical Solution

In one general aspect, an overcharge preventing device includes: an input voltage dividing unit connected across at least one battery cell in a battery pack including a plurality of battery cells and dividing a voltage of the battery cell; a voltage sensing unit connected to the input voltage dividing unit and operated when it is sensed that a voltage input through the input voltage dividing unit is a predetermined voltage or more; and a power cut-off unit connected to the voltage sensing unit and turning on or turning off an internal switch by the operation of the voltage sensing unit to cut off power supplied to the battery pack.

The power cut-off unit may include coil units and a switch unit, the voltage sensing unit may be connected to the coil unit, a line of a relay coil side controlled by a battery management system (BMS) may be connected to the switch unit, and the switch unit may cut off an electrical connection to cut off power of the line of the relay coil side when power is applied to the coil unit by the operation of the voltage sensing unit.

The input voltage dividing unit may include a plurality of resistors connected to each other in series.

The voltage sensing unit may be configured of a shunt regulator, an anode of the shunt regulator may be connected between the resistors of the input voltage dividing unit, a cathode of the shunt regulator may be connected to a positive electrode of the battery cell to which the input voltage dividing unit is connected, a reference of the shunt regulator may be connected to a negative electrode of the battery cell to which the input voltage dividing unit is connected, and the cathode and the reference of the shunt regulator may be electrically conducted to each other when an input voltage divided using the input voltage dividing unit is input as a predetermined voltage or more.

The power cut-off unit may include coil units and a switch unit, one side of the coil unit may be connected to the positive electrode of the battery cell to which the input voltage dividing unit is connected and the other side thereof may be connected to the cathode of the shunt regulator, and one side of the switch unit may be connected to a line of a relay coil side controlled by a battery management system (BMS) and the other side thereof may be connected to a common line (−).

The power cut-off unit may be configured of a non-return circuit operating the switch unit when the power is applied to the coil unit by the operation of the voltage sensing unit and maintaining an operation state as it is until before a separate control is performed.

The power cut-off unit may be configured of a latching relay.

The power cut-off unit may include a resistor connected to the coil units in parallel between the coil units of the power cut-off unit.

The overcharge preventing device may further include a safety unit connected across the battery cell or to the anode of the shunt regulator and the reference of the shunt regulator.

The safety unit may be at least any one of a capacitor and a TVS diode.

Advantageous Effects

In the battery overcharge preventing device according to an exemplary embodiment of the present invention, when overcharge is generated during a period in which the battery pack is charged, the power supplied to the battery pack is cut off, thereby making it possible to prevent ignition or explosion.

In addition, the power of the relay coil side controlled by the battery management system is cut off at the time of the overcharge of the battery pack by the power cut-off unit connected to the line of the relay coil side controlled by the battery management system, such that the power supplied to the battery pack is cut off regardless of the control of the battery management system, thereby making it possible to prevent the ignition or the explosion.

Further, the voltage divided by the input voltage dividing unit is used as an input voltage of the voltage sensing unit, such that the voltage sensing unit may be variously configured.

Further, the voltage sensing unit configured of the shunt regulator is used to minimize an operation deviation depending on a temperature of the voltage sensing unit, thereby making it possible to improve an operation precision.

Further, an overcharge sensing circuit and a circuit of the power supplied to the battery pack are separately configured, thereby making it possible to minimize power consumed by the voltage sensing unit at ordinary times.

Further, the power cut-off unit is configured of the non-return circuit to cut off the power supplied to the battery pack until before a separate control is performed after the overcharge is generated, thereby making it possible to increase stability.

Further, since the power cut-off unit configured of the latching relay is used, a separate component of a self hold circuit is not required, such that a size, a cost, and a weight may be decreased.

Further, noise generated at the time of an operation of the coil units may be decreased by the resistor connected to the coil units of the power cut-off unit in parallel to allow the voltage sensing unit not to be affected by the noise, thereby making it possible to improve a precision of the voltage sensing unit.

Furthermore, due to the safety unit, an error rate may be decreased, and an influence of an instantaneous voltage rise on other elements is minimized, thereby making it possible to improve stability and operation reliability.

BEST MODE

Figure 1:
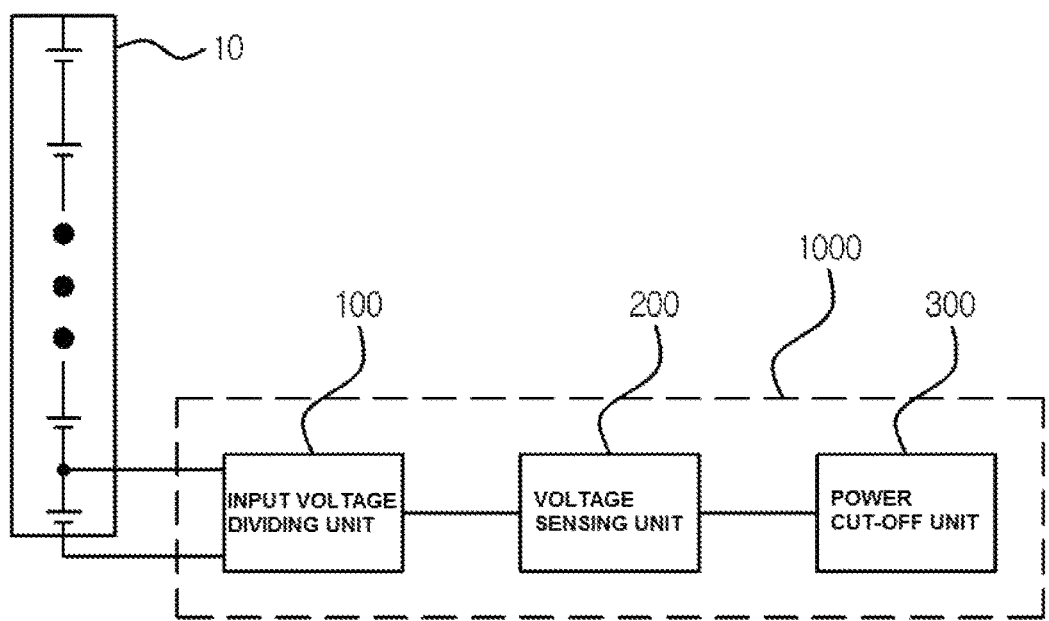
FIG. 1 is a conceptual diagram of a battery overcharge preventing device according to an exemplary embodiment of the present invention.

Hereinafter, the present invention will be described in detail with reference to the accompanying drawings. It is to be noted that throughout the accompanying drawings, the same components are denoted by the same reference numerals. In addition, a detailed description for the well-known functions and configurations that may unnecessarily make the gist of the present invention unclear will be omitted.

Figure 2:
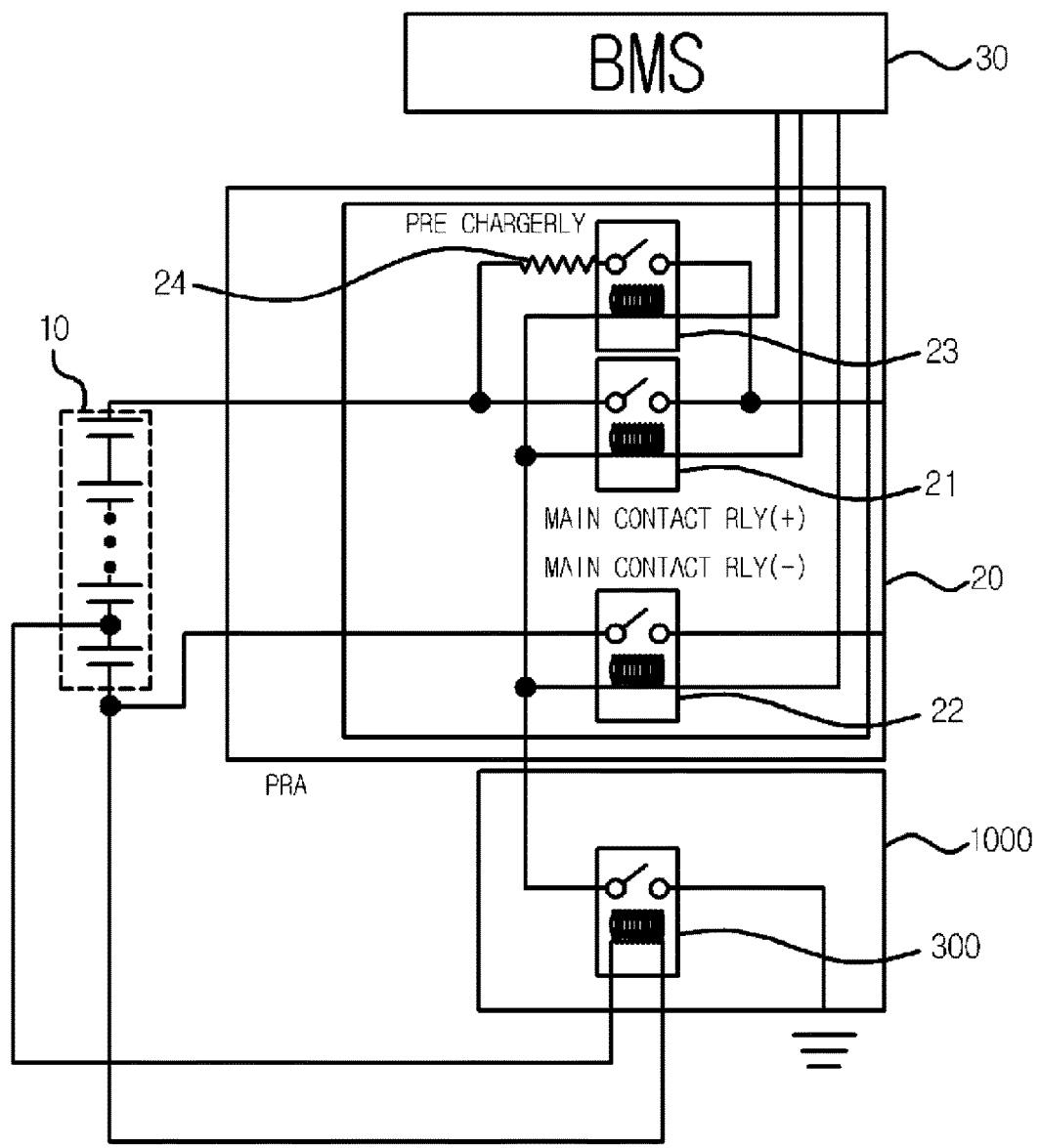
FIG. 2 is an illustrative view illustrating a connection of a power cut-off unit of the battery overcharge preventing device according to an exemplary embodiment of the present invention.
Figure 3:
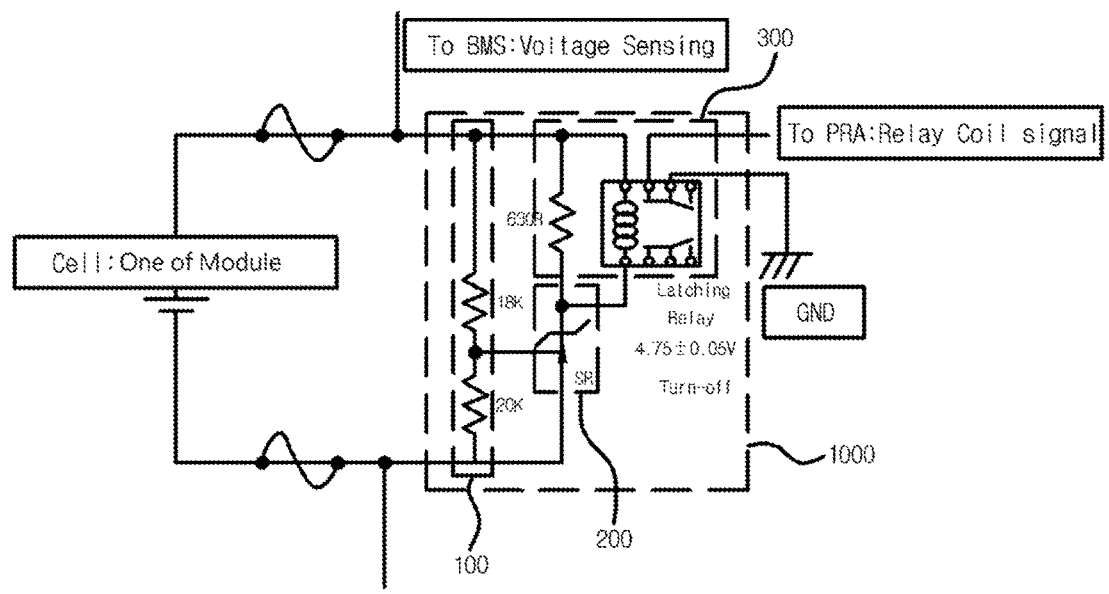
FIG. 3 is a circuit diagram of the battery overcharge preventing device according to an exemplary embodiment of the present invention.
Figure 4:
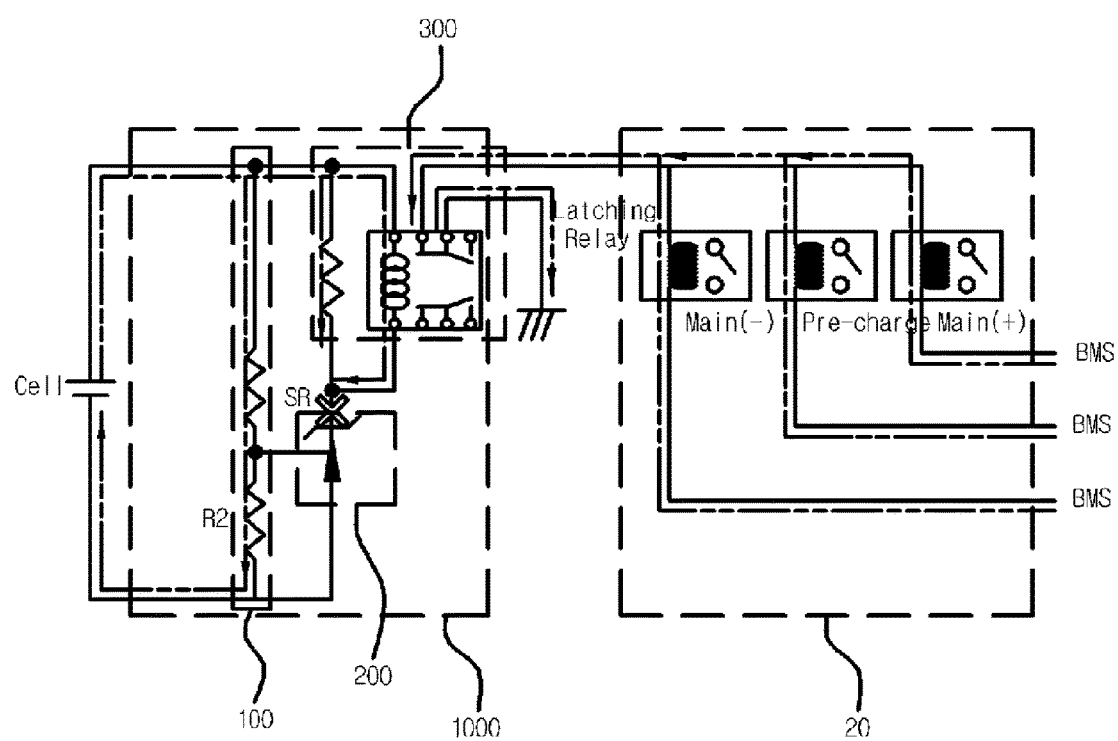
FIG. 4 is a circuit diagram illustrating a case that is not in an overcharge state in the battery overcharge preventing device according to an exemplary embodiment of the present invention.
Figure 5:
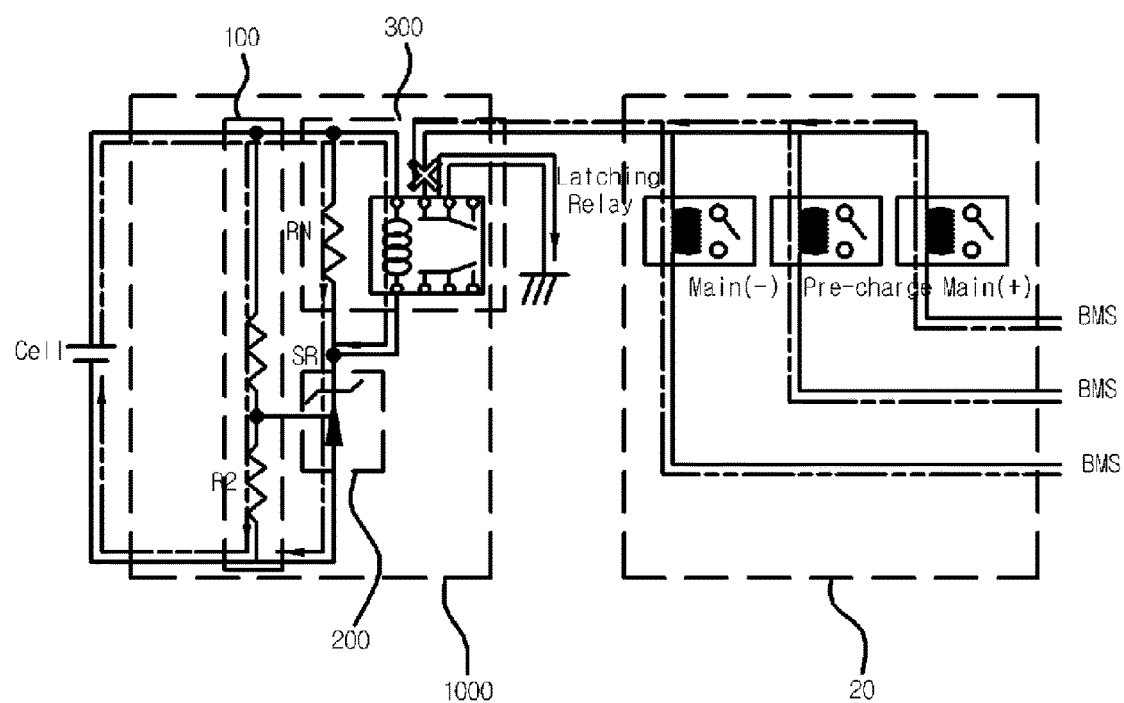
FIG. 5 is a circuit diagram illustrating an overcharge state in the battery overcharge preventing device according to an exemplary embodiment of the present invention.
Figure 6:
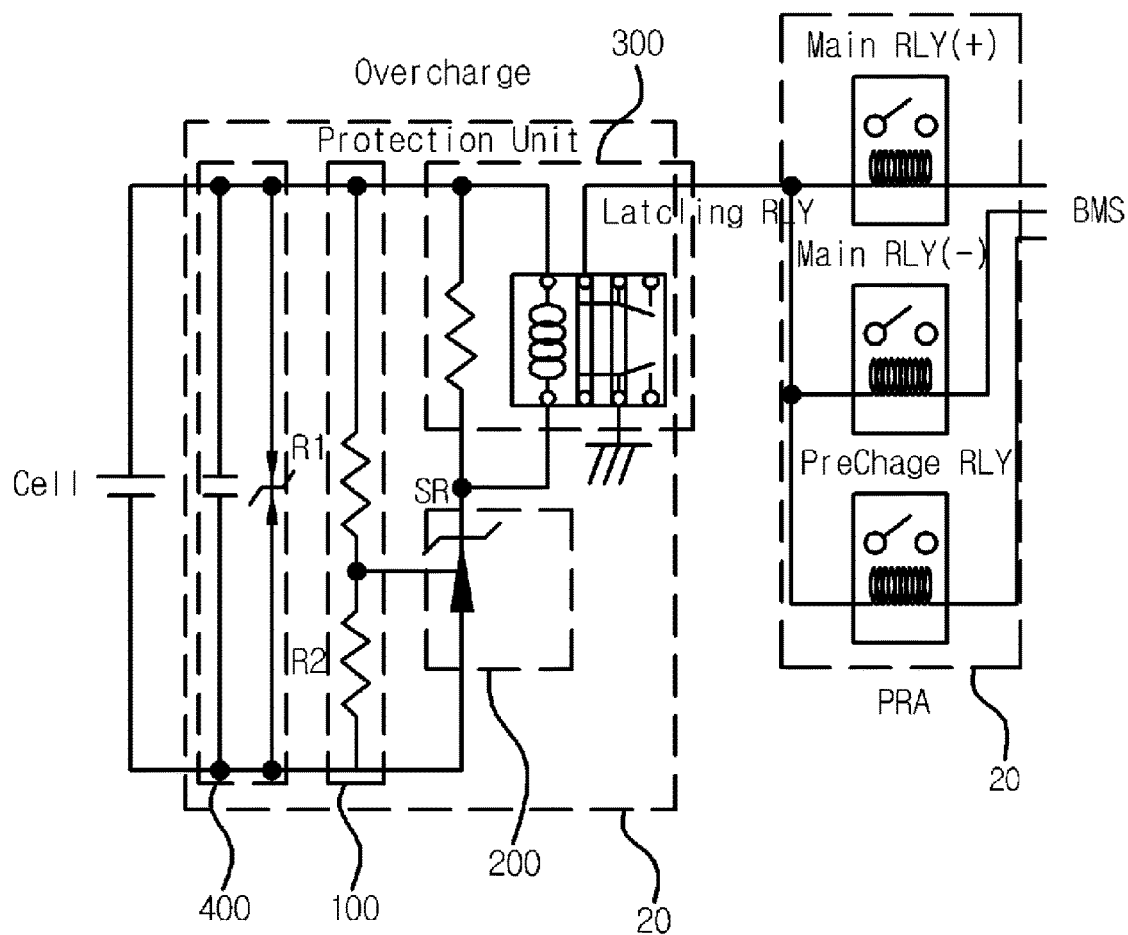
FIG. 6 is a circuit diagram illustrating the battery overcharge preventing device including a safety unit according to an exemplary embodiment of the present invention.
Figure 7:
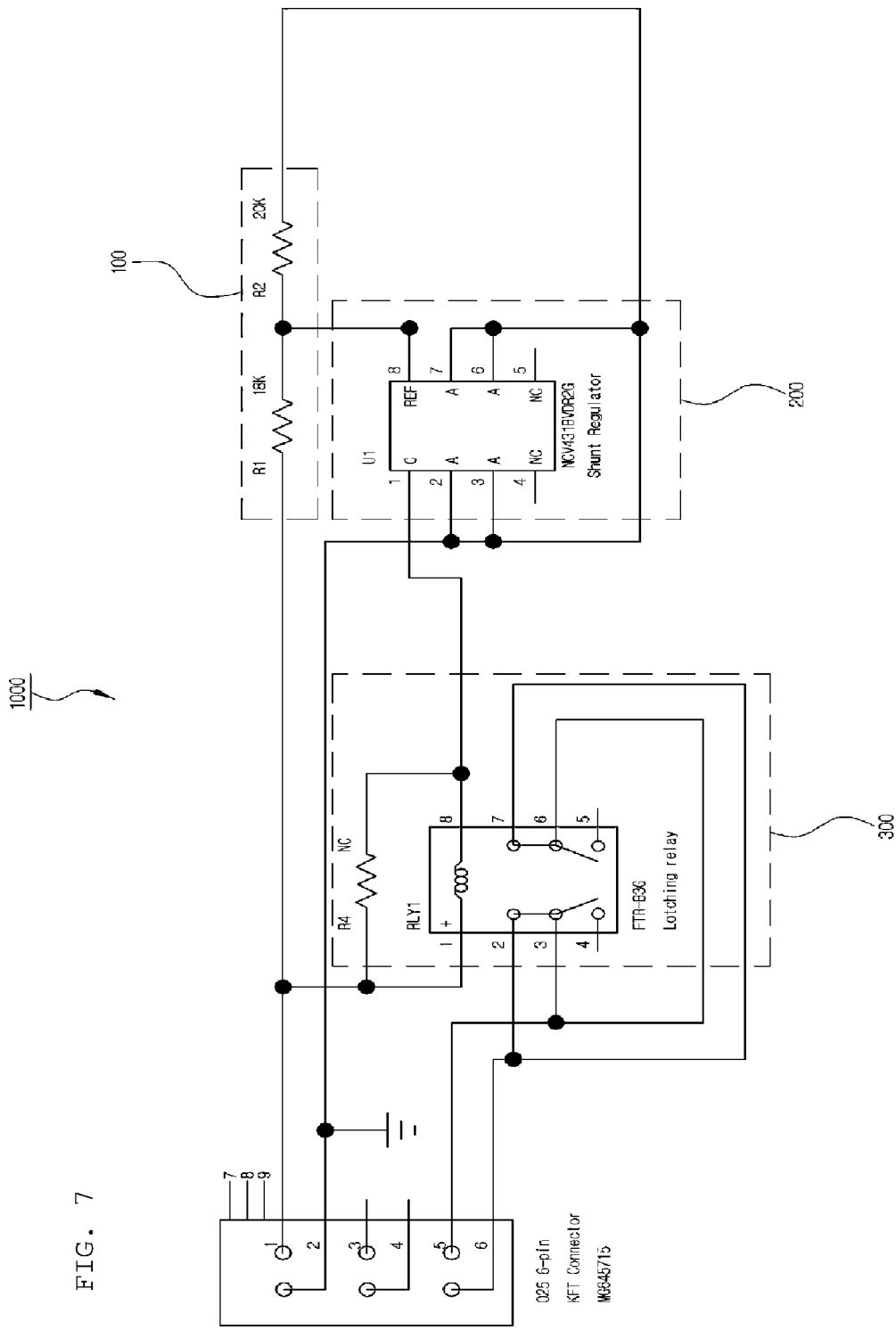
FIG. 7 is a circuit diagram illustrating an example of implementing the battery overcharge preventing device according to an exemplary embodiment of the present invention.
Figure 8:
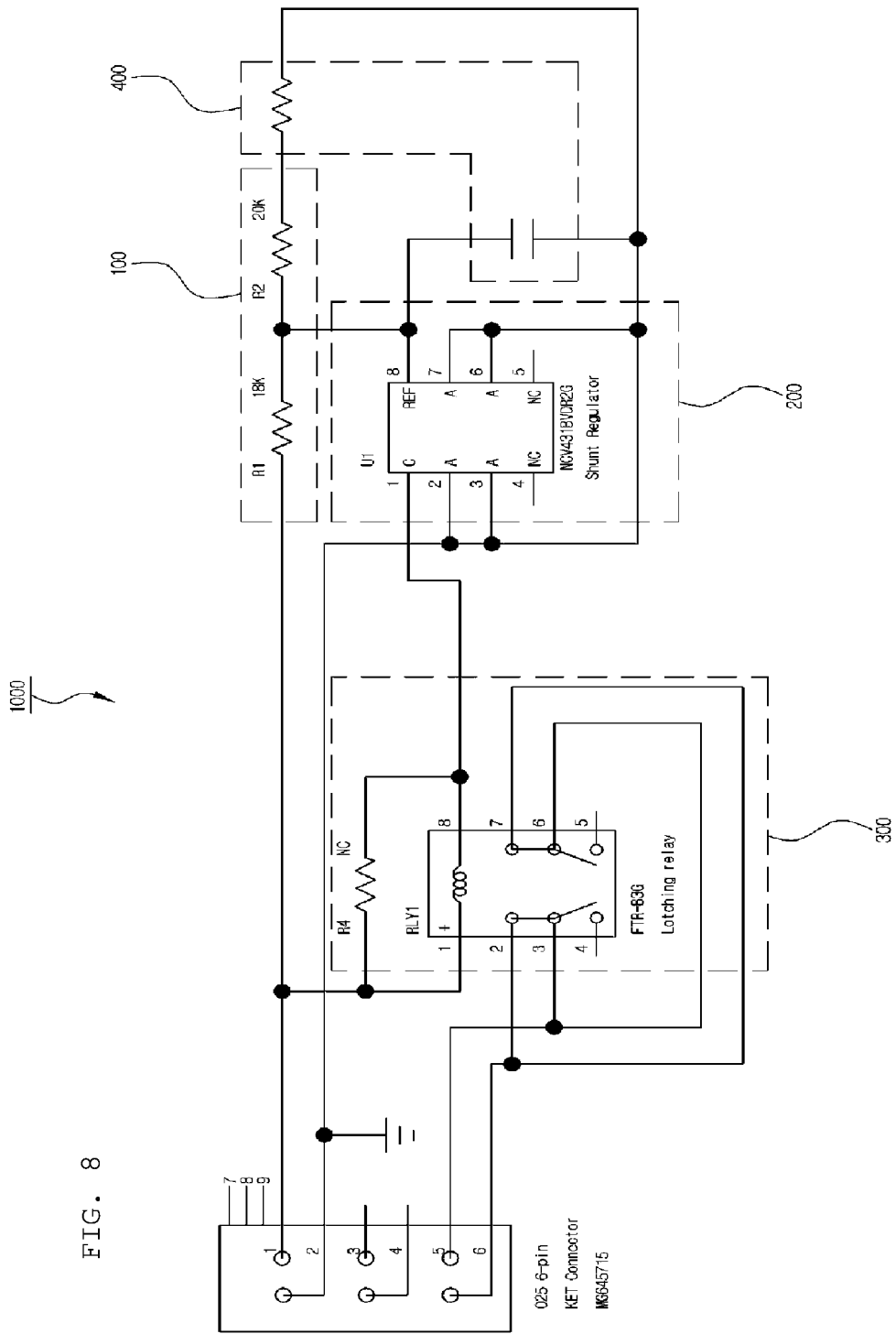
FIG. 8 is a circuit diagram illustrating an example of implementing the battery overcharge preventing device including a safety unit according to an exemplary embodiment of the present invention.

FIG. 1 is a conceptual diagram of a battery overcharge preventing device according to an exemplary embodiment of the present invention, FIG. 2 is an illustrative view illustrating a connection of a power cut-off unit of the battery overcharge preventing device according to an exemplary embodiment of the present invention, FIG. 3 is a circuit diagram of the battery overcharge preventing device according to an exemplary embodiment of the present invention, FIG. 4 is a circuit diagram illustrating a case that is not in an overcharge state in the battery overcharge preventing device according to an exemplary embodiment of the present invention, FIG. 5 is a circuit diagram illustrating an overcharge state in the battery overcharge preventing device according to an exemplary embodiment of the present invention, FIG. 6 is a circuit diagram illustrating the battery overcharge preventing device including a safety unit according to an exemplary embodiment of the present invention, FIG. 7 is a circuit diagram illustrating an example of implementing the battery overcharge preventing device according to an exemplary embodiment of the present invention, and FIG. 8 is a circuit diagram illustrating an example of implementing the battery overcharge preventing device including a safety unit according to an exemplary embodiment of the present invention.

As illustrated in FIG. 1, the battery overcharge preventing device 1000 according to an exemplary embodiment of the present invention is configured to include an input voltage dividing unit 100, a voltage sensing unit 200, and a power cut-off unit 300.

In a battery pack 10 including a plurality of battery cells, when overcharge is generated during a period in which the battery pack 10 is charged, a voltage of the battery cell rises, and it may be confirmed whether or not the battery cell is overcharged using a voltage value at the time of overcharge of the battery cell. Therefore, the voltage of the battery cell may be used as input power of a passive element to operate the passive element at a predetermined voltage, thereby cutting off the overcharge.

The input voltage dividing unit 100 is connected across at least one battery cell in the battery pack 10 including the plurality of battery cells, and divides the voltage of the battery cell.

A voltage value across the at least one battery cell that may be decided to be the overcharge and a voltage value for operating the passive element may be different from each other.

In the case in which the voltage across the at least one battery cell is used as the input power of the passive element, such that it is decided that the voltage across the at least one battery cell is a voltage at the time of the overcharge, the input voltage dividing unit 100 divides an input voltage (the voltage across the at least one battery cell) so that the passive element is operated.

Here, the input voltage dividing unit 100 is configured to receive the voltage of the at least one battery cell in the battery pack 10 including the plurality of battery cells as the input voltage.

In other words, the input voltage dividing unit 100 may be connected to a battery side so as to receive the voltage of the at least one battery cell in the battery pack 10 including the plurality of battery cells as the input voltage or receive a total voltage of the battery pack 10 as the input voltage. In addition, several overcharge preventing devices may be configured by configuring several input voltage dividing units such as a first input voltage dividing unit receiving the voltage of the at least one battery cell in the battery pack 10 including the plurality of battery cells as the input voltage, a second input voltage dividing unit receiving the total voltage of the battery pack 10 as the input voltage, and the like, and using a first voltage sensing unit, a second voltage sensing unit, a first power cut-off unit, a second power cut-off unit, and the like, each connected to the several input voltage dividing units. That is, a plurality of battery overcharge preventing devices 1000 may be configured and used.

In FIG. 1, a form in which a solid state relay receives a voltage of a unit battery cell connected to the lowest portion in the battery pack 10 as an input voltage is illustrated by way of example.

The voltage sensing unit 200 is connected to the input voltage dividing unit 100, and is operated when it is sensed that a voltage input through the input voltage dividing unit is a predetermined voltage or more.

The power cut-off unit 300 is connected to the voltage sensing unit 200, and turns on or turns off an internal switch by the operation of the voltage sensing unit 200 to cut off power supplied to the battery pack 10.

In other words, when the voltage input to the voltage sensing unit 200 is a voltage at the time of generation of the overcharge, the power supplied to the battery pack 10 may be cut off using the power cut-off unit 300. That is, the power supplied to the battery pack 10 is cut off without being affected by an external circuit (battery management system (BMS)), or the like, when the overcharge is generated during a period in which the battery pack 10 is charged, thereby making it possible to prevent ignition or explosion.

As illustrated in FIG. 2, the battery cell 10 may be configured to include a power relay assembly (PRA) 20 connected to the battery cell 10 and a battery management system (BMS) 30 controlling the respective relays included in the power relay assembly 20.

The power relay assembly 20 may be configured to include a first main relay (+) 21, a second main relay 22 (−), a pre-charge relay 23, and a pre-charge resistor 24.

The first main relay (+) 21 may be connected to a positive electrode terminal of the battery pack 10, and may cut off an electrical connection with the battery pack 10.

The second main relay (−) 22 may be connected to a negative electrode terminal of the battery pack 10, and may cut off an electrical connection with the battery pack 10.

The pre-charge resistor 24 and the pre-charge relay 23 allow a current output from the battery pack 10 to be pre-charged before being connected to the first main relay 21. Through this, an arc discharge that may be generated at the time of being directly connected to the first main relay 21 is prevented, thereby making it possible to secure stability of a circuit. Here, the pre-charge relay 23 may be connected to the first main relay (+) 21 in parallel, and the pre-charge resistor 24 may be connected to the pre-charge relay 23 in series.

An electrical connection and disconnection of a general battery pack 10 through the power relay assembly 20 are possible, and the respective relays of the power relay assembly 20 are controlled by the battery management system 30.

The power cut-off unit 300 may be configured to include coil units and a switch unit.

The coil unit is connected to the voltage sensing unit 200.

Although not illustrated in FIG. 2, the voltage sensing unit 200 may apply the power to the coil unit of the power cut-off unit 300.

The switch unit is connected to a line of a relay coil side controlled by the battery management system 30.

Here, when the power is applied to the coil unit of the power cut-off unit 300 by the operation of the voltage sensing unit 200, the switch unit of the power cut-off unit 300 may cut off an electrical connection to cut off the power of the line of the relay coil side. That is, since the power may not be applied to the respective relay coils by cutting off the power of the line of the relay coil side, the control of the respective relays by the battery management system 30 is impossible, and the respective relays are maintained in a state in which the electrical connection is cut off, such that the power supplied to the battery pack 10 is cut off.

In other words, the power of the relay coil side controlled by the battery management system is cut off at the time of the overcharge of the battery pack 10 by the power cut-off unit 300 connected to the line of the relay coil side controlled by the battery management system 30, such that the power supplied to the battery pack 10 is cut off regardless of the control of the battery management system 30, thereby making it possible to prevent the ignition or the explosion without being affected by occurrence of a problem of the battery management system 30.

As illustrated in FIG. 3, the input voltage dividing unit 100 may be configured to include a plurality of resistors connected to each other in series. Here, the input voltage dividing unit 100 divides the voltage of the battery cell in order that a voltage used for the operation of the voltage sensing unit 200 may compare with a voltage appearing at the time of the overcharge of the battery cell. For example, in the case in which the voltage appearing at the time of the overcharge of the battery cell is 4.75V and the voltage required for the operation of the voltage sensing unit 200 is 2.5V, when resistors having resistance values of 18 KΩ and 20 KΩ are used as illustrated in FIG. 3, in the case in which the voltage of the battery cell is 4.75V (the voltage at the time of the overcharge) or more, the voltage sensing unit 200 may be operated.

In other words, in the case in which the voltage (the voltage of the battery cell used for sensing the overcharge) input to the input voltage dividing unit 100 is the voltage at the time of the overcharge, the voltage may be divided using the plurality of resistors in order to be adjusted to the voltage that may operate the voltage sensing unit 200.

The plurality of resistors of the input voltage dividing unit 100 that are connected to each other in series may select a battery resistance value depending on whether the input voltage dividing unit 100 receives the voltage of the at least one battery cell as the input voltage or receives the total voltage of the battery pack 10 as the input voltage.

Since the voltage divided by the input voltage dividing unit is used as the input voltage of the voltage sensing unit, various kinds of voltages (a voltage of one cell, a voltage of a plurality of cells, a total voltage of the battery pack, and the like) may be used as the input voltage, and the voltage sensing unit may be variously configured (there is no limitation depending on the voltage for operating the voltage sensing unit).

As illustrated in FIG. 3, the voltage sensing unit 200 is configured of a shunt regulator, which may be configured to include anode, cathode, and reference terminals.

Here, the anode of the shunt regulator is connected between the resistors of the input voltage dividing unit 100, the cathode thereof is connected to the positive electrode of the battery cell to which the input voltage dividing unit 100 is connected, and the reference thereof is connected to the negative electrode of the battery cell to which the input voltage dividing unit 100 is connected.

Here, when the input voltage divided using the input voltage dividing unit 100 is input as a predetermined voltage or more, the cathode and the reference of the shunt regulator are electrically conducted to each other.

As illustrated in FIG. 4, in the case in which a voltage smaller than a preset voltage is applied to the anode of the shunt regulator SR, the cathode and the reference are electrically cut off from each other.

As illustrated in FIG. 5, in the case in which a voltage larger than a preset voltage is applied to the anode of the shunt regulator SR, the cathode and the reference are electrically conducted (operated) to each other.

Generally, considering that a magnitude of a charging voltage of a unit battery cell is 4.2V, in the case in which the voltage of the unit battery cell is received as the input voltage, as illustrated in FIG. 3, a magnitude of the voltage at which it is sensed that the battery is overcharged is a value between 4.2V and 5V.

For example, in the case in which the voltage appearing at the time of the overcharge of the battery cell is 4.75V and the voltage required for the operation of the voltage sensing unit 200 is 2.5V, when the resistors having the resistance values of 18 KΩ and 20 KΩ are used as illustrated in FIG. 3, in the case in which the voltage of the battery cell is a value of 4.75V (the voltage at the time of the overcharge) or more, a value of 2.5V or more is applied to the anode of the shunt regulator, such that the cathode and the reference are electrically conducted (operated) to each other.

Since a deviation of an operating voltage of the shunt regulator depending on an external temperature is significantly smaller than that of a solid state relay (SSR), or the like, it may be applied to an element requiring a high precision, and an operation deviation is minimized using the shunt regulator, thereby making it possible to improve an operation precision.

A magnitude of the voltage at which it may be sensed whether or not the battery is overcharged may be determined depending on whether the voltage of the at least one battery cell is received as the input voltage or the total voltage of the battery pack 10 is received as the input voltage.

As illustrated in FIG. 3, the power cut-off unit 300 may be configured to include the coil units and the switch unit.

One side of the coil unit is connected to the positive electrode of the battery cell to which the input voltage dividing unit 100 is connected, and the other side thereof is connected to the cathode of the shunt regulator.

One side of the switch unit is connected to the line of the relay coil side controlled by the battery management system (BMS), and the other side thereof is connected to a common line (−).

In order to cut off the power supplied to the battery pack, all of the electrical connections to the battery pack need to be cut off. For example, in the case in which the power relay assembly is connected to the battery pack, the electrical connections of the first main relay (+), the second main relay (−), and the pre-charge relay need to be cut off. In order to cut off the electrical connections of all of the respective relays at a time, the power cut-off unit 300 is connected between the common lines connected to the respective relay coils to cut off the common lines, thereby making it possible to easily cut off the electrical connections of all the relays.

In addition, an overcharge sensing circuit (circuit connected to the coil unit) and a circuit (circuit connected to the switch unit) of the power supplied to the battery pack 10 are separately configured, thereby making it possible to minimize power consumed by the voltage sensing unit at ordinary times.

The power cut-off unit 300 may be configured of a non-return circuit operating the switch unit when the power is applied to the coil unit by the operation of the voltage sensing unit 200 and maintaining an operation state as it is until before a separate control is performed.

The non-return circuit, which is a component operating the switch unit when the power is applied to the coil unit, maintains the operation state of the switch unit as it is until before the separate control is performed.

The power cut-off unit configured of the non-return circuit cuts off power supplied to a battery module until before the separate control is performed through the non-return circuit, thereby making it possible to prevent an additional accident from occurring until before the follow-up measure against the overcharge of the battery is performed.

In addition, the power cut-off unit is configured of the non-return circuit to cut off the power supplied to the battery pack 10 until before the separate control is performed after the overcharge is generated, thereby making it possible to increase stability.

The power cut-off unit 300 may be configured of a latching relay.

FIG. 3 illustrates a form in which a latching relay element is provided as the power cut-off unit 300. The latching relay element is a relay element in which a contact state of a contact is maintained as it is even though a current supplied to the coil is cut off until before the separate control is performed.

For example, in the case in which the voltage appearing at the time of the overcharge of the battery cell is 4.75V and the voltage required for the operation of the voltage sensing unit 200 is 2.5V, when a cell voltage is less than 4.75V, as illustrated in FIG. 4, the shunt regulator becomes a state in which it may not be electrically conducted, and the latching relay also maintains an initial state in which the voltage sensing unit 200 is not operated, such that controls of power relays (controls of the first main relay (+), the second main relay (−), and the pre-charge relay) by the battery management system 30 are possible.

In addition, when the cell voltage is 4.75V or more, as illustrated in FIG. 5, the shunt regulator becomes a state in which it is electrically conducted, and the latching relay is operated to cut off the current supplied to a coil end of the power relay assembly, such that the electrical connections of all of the respective relays (the first main relay (+), the second main relay (−), and the pre-charge relay) are cut off.

Here, after the latching relay is operated on the basis of an overcharge voltage, the latching relay does not return to an initial state (state in which a relay control is possible by the battery management system 30) while continuously maintaining the internal switch in a current state (overcharge cut-off state) until before a separate control is performed.

Therefore, in the case in which the switch of the latching relay is changed due to generation of the overcharge state of the battery, the voltage input to the input voltage driving unit 100 may be configured to be transferred to the battery management system 30 until before a separate control is performed, as illustrated in FIG. 3. In other words, it is possible to inform the battery management system 30 whether or not the battery cell is overcharged regardless of whether or not the relays in the power relay assembly 20 cut off the power. An alarm, or the like, is generated so that the overcharge may be recognized in the outside or the inside of a vehicle, thereby making it possible to inform the outside or the inside of the vehicle of the overcharge state sensed as described above. In other words, a signal for informing the outside of the overcharge state of the battery is continuously provided to the outside until before a separate control is performed on the latching relay, thereby making it possible to prevent an additional accident from occurring until before the follow-up measure against the overcharge of the battery is performed.

In addition, since the power cut-off unit configured of the latching relay is used, a separate component of a self hold circuit is not required, such that a size, a cost, and a weight may be decreased.

FIG. 7 illustrates an example of directly implementing the battery overcharge preventing device 1000 using an applicable element. Connectors may be mounted on a printed circuit board (PCB) on which only elements configuring the battery overcharge preventing device 1000 are mounted to thereby be connected to the battery cells and the power relay assembly 20, and one unit may be configured and may be mounted at any place in the battery pack 10, such that a layout is free.

As another example, elements that may be used in the battery overcharge preventing device 1000 may be mounted and configured on a sensing PCB transferring the voltage of the battery cell to the battery management system 30. In this case, the battery overcharge preventing device 1000 may be configured without adding a connector by increasing only a required number of pins in an existing sensing PCB connector, such that a size, a manufacturing cost, and a weight of the battery pack may be decreased.

In other words, a position at which the battery overcharge preventing device 1000 according to an exemplary embodiment of the present invention is mounted is not limited to a position such as a voltage sensing PCB, an inner portion of the battery pack 10, or the like.

As illustrated in FIG. 3, the power cut-off unit 300 may be configured to include a resistor connected to the coil units in parallel between the coil units of the power cut-off unit 300.

Noise generated at the time of an operation of the coil units may be decreased by the resistor connected to the coil units of the power cut-off unit 300 in parallel, and an influence of the voltage sensing unit 200 on the noise is minimized, thereby making it possible to improve a precision of the voltage sensing unit 200.

As illustrated in FIG. 6, the battery overcharge preventing device according to an exemplary embodiment of the present invention may be configured to include a safety unit 400 connected across the battery cell or to the anode of the shunt regulator and the reference of the shunt regulator.

Here, the safety unit 400 may be configured to include at least any one of a capacitor and a TVS diode.

FIG. 8 illustrates an example of directly implementing the battery overcharge preventing device using an applicable element.

In the present invention described above, a function of sensing the overcharge state of the battery may be provided separately from the battery management system 30, thereby making it possible to additionally secure stability of the vehicle and satisfy the ISO26262 standard.

In addition, since the overcharge is sensed in an electrical scheme to cut off the power supplied to the battery pack in the electrical scheme, reliability may be improved as compared with a mechanical scheme.

The present invention is not limited to the above-mentioned exemplary embodiments, and may be variously applied, and may be variously modified without departing from the gist of the present invention claimed in the claims.

[Detailed Description of Main Elements]

| | |
|---|---|
| 10: battery pack | 20: power relay assembly |
| 21: first main relay | 22: second main relay |
| 23: pre-charge relay | 24: pre-charge resistor |
| 30: battery management system | 100: input voltage dividing unit |
| 200: voltage sensing unit | 300: power cut-off unit |

The invention claimed is:

1. An overcharge preventing device comprising:
an input voltage dividing unit connected across at least one battery cell in a battery pack including a plurality of battery cells and dividing a voltage of the battery cell;
a voltage sensing unit connected to the input voltage dividing unit and operated when it is sensed that a voltage input through the input voltage dividing unit is a predetermined voltage or more; and
a power cut-off unit connected to the voltage sensing unit and turning on or turning off an internal switch by the operation of the voltage sensing unit to cut off power supplied to the battery pack,
wherein the power cut-off unit is connected to a relay coil of a power relay assembly connected to the battery pack, the power cut-off unit cuts off an electrical power of the relay coil regardless of the control of a battery management system to cut off electrical power of the battery pack when the battery cell is overcharged, and the power cut-off unit does not return to an initial state while continuously maintaining the internal switch in current state until a separate control is performed.

2. The overcharge preventing device of claim 1, wherein the power cut-off unit includes a coil unit and a switch unit, the voltage sensing unit is connected to the coil unit, a line of the relay coil is connected to the switch unit, and the switch unit cuts off an electrical connection to cut off power of the line of the relay coil side when power is applied to the coil unit by the operation of the voltage sensing unit.

3. The overcharge preventing device of claim 1, wherein the input voltage dividing unit includes a plurality of resistors connected to each other in series.

4. The overcharge preventing device of claim 3, wherein the voltage sensing unit is configured of a shunt regulator, an anode of the shunt regulator is connected between the resistors of the input voltage dividing unit, a cathode of the shunt regulator is conducted to a positive electrode of the battery cell to which the input voltage dividing unit is connected, a reference of the shunt regulator is connected to a negative electrode of the battery cell to which the input voltage dividing unit is connected, and the cathode and the reference of the shunt regulator are electrically connected to each other when an input voltage divided using the input voltage dividing unit is input as a predetermined voltage or more.

5. The overcharge preventing device of claim 4, wherein the power cut-off unit includes a coil unit and a switch unit,
one side of the coil unit is connected to the positive electrode of the battery cell to which the input voltage dividing unit is connected and the other side thereof is connected to the cathode of the shunt regulator, and
one side of the switch unit is connected to a line of a relay coil side controlled by a battery management system (BMS) and the other side thereof is connected to a common line (−).

6. The overcharge preventing device of claim 5, wherein the power cut-off unit is configured of a non-return circuit operating the switch unit when the power is applied to the coil unit by the operation of the voltage sensing unit and maintaining an operation state as it is until before a separate control is performed.

7. The overcharge preventing device of claim 5, wherein the power cut-off unit is configured of a latching relay.

8. The overcharge preventing device of claim 5, wherein the power cut-off unit includes a resistor connected to the coil unit in parallel between the coil unit of the power cut-off unit.

9. The overcharge preventing device of claim 5, further comprising a safety unit connected across the battery cell or to the anode of the shunt regulator and the reference of the shunt regulator.

10. The overcharge preventing device of claim 9, wherein the safety unit is at least any one of a capacitor and a TVS diode.

* * * * *